(12) United States Patent
Untch et al.

(10) Patent No.: US 8,925,973 B2
(45) Date of Patent: Jan. 6, 2015

(54) SYSTEM AND METHOD FOR CONNECTING TWO FLEXIBLE CONTAINERS

(71) Applicant: Flecotec AG, Muellheim (DE)

(72) Inventors: Guenter Untch, Muellheim (DE); Peter Lais, Muellheim (DE); Martin Koch, Neuenburg (DE)

(73) Assignee: Flecotec AG, Muellheim (DE)

( * ) Notice: Subject to any disclaimer, the term of this patent is extended or adjusted under 35 U.S.C. 154(b) by 0 days.

(21) Appl. No.: 13/914,685

(22) Filed: Jun. 11, 2013

(65) Prior Publication Data

US 2013/0334813 A1    Dec. 19, 2013

(30) Foreign Application Priority Data

Jun. 15, 2012    (DE) .......................... 10 2012 105 233

(51) Int. Cl.
| | |
|---|---|
| *F16L 31/00* | (2006.01) |
| *B65D 33/00* | (2006.01) |
| *E21F 1/06* | (2006.01) |
| *F16L 25/10* | (2006.01) |
| *F16L 21/02* | (2006.01) |

(52) U.S. Cl.
CPC . *B65D 33/00* (2013.01); *E21F 1/06* (2013.01); *F16L 25/10* (2013.01); *F16L 31/00* (2013.01); *F16L 21/02* (2013.01)
USPC .......................................... 285/260; 285/425

(58) Field of Classification Search
CPC .............................. F16L 25/0045; F16L 31/00
USPC .................................................. 285/260, 425
See application file for complete search history.

(56) References Cited

U.S. PATENT DOCUMENTS

| | | | | | |
|---|---|---|---|---|---|
| 1,274,438 | A | * | 8/1918 | Nettleton | 285/260 |
| 1,525,538 | A | * | 2/1925 | Evans | 285/260 |
| 2,129,105 | A | * | 9/1938 | Spence | 55/370 |
| 2,410,786 | A | * | 11/1946 | Mallory | 285/260 |
| 2,567,773 | A | * | 9/1951 | Krupp | 285/110 |
| 2,984,503 | A | * | 5/1961 | Cunningham | 285/260 |
| 3,406,502 | A | * | 10/1968 | Wiik | 55/341.1 |
| 4,015,961 | A | | 4/1977 | Howard et al. | |

FOREIGN PATENT DOCUMENTS

| | | | | |
|---|---|---|---|---|
| DE | 704 629 C | | 4/1941 | |
| DE | 37 09 365 A1 | | 9/1988 | |
| EP | 1 656 311 B1 | | 9/2009 | |
| GB | 2027148 A | * | 2/1980 | F16L 21/08 |
| GB | 2061437 A | * | 5/1981 | F16L 21/08 |

* cited by examiner

*Primary Examiner* — Aaron Dunwoody
(74) *Attorney, Agent, or Firm* — Muirhead and Saturnelli, LLC

(57) ABSTRACT

A system and method for connecting two flexible containers is provided, in particular for the environmentally sealed connecting of two open ends of tubular films. The method has at least the following method steps of: everting a first open end of a first flexible container over a first ring; everting a second open end of a second flexible container over a second ring, subsequently inserting the first ring through the second ring into the inside of the second flexible container; subsequently aligning, in a parallel and coaxial relationship, the rings in relation to one another; and abutting the rings with the ends clamped in between them.

4 Claims, 6 Drawing Sheets

SYSTEM AND METHOD FOR CONNECTING TWO FLEXIBLE CONTAINERS

TECHNICAL FIELD

This application relates to a method for connecting two flexible containers.

BACKGROUND OF THE INVENTION

Devices for the contamination-free docking of flexible containers are well known from the prior art, for example from EP 1 656 311 B1, which is incorporated herein by reference. Known devices, however, consist mostly of a plurality of elements which are complex to combine in order to connect a flexible container to a flange or another container in a manner that is as environmentally tight as possible. The flexible container here is clamped between at least two elements. The clamping may assisted by an auxiliary device, for example by an encircling clamping ring which encompasses the elements together.

Accordingly, it would be desirable to provide a simple method for connecting two flexible containers, wherein the simplest possible devices are to be used. In particular the aim is for two open tubular film ends having the same diameter to be reversibly connected to one another as tightly as possible with the lowest possible outlay.

SUMMARY OF THE INVENTION

According to the system described herein, for a flexible container having an open end, in particular for each open tubular film end of two fundamentally corresponding tubular films having the same diameter, a flexible ring is placed around the respective open end.

Two rings of identical construction intact particularly advantageously as follows. One of the open ends belonging to a first container, and placed around a first of the rings or is inserted in a slightly slanted manner through the other everted open end—referred to below as second end—of a second container in order to achieve a state of insertion into the second container, wherein an elasticity of the at least first ring enables the insertion in the first place.

In the inserted state, the rings are aligned parallel in relation to one another and subsequently, by pulling on the ends, the rings are brought into abutment by way of a narrow circumferential surface approximating a line, but (invariably) always over the entire circumference.

According to an advantageous embodiment of rings according to the system described herein, at least one of the rings is shaped such that a latching state is achieved when the rings are brought into abutment.

The method according to the system described herein is implementable manually as well as mechanically using simple devices comprising few components. Advantageous embodiments ensure additional safeguarding against uncontrolled disengaging of the rings from the state which is achieved after abutment has occurred.

Connections produced according to the system described herein between flexible containers have already been successfully tested for tightness. The design is dynamic with respect to tightness, i.e. an increase in pressure increases tightness. As pressure increases, the rings are pressed against one another synchronously with increasing force.

According to an advantageous embodiment of rings used according to the system described herein, the rings have a like, in particular rounded, cross section. They consist preferably of the plastics polyoxymethylene (POM), polyethylene (PE) or polyamide (PA).

According to a further advantageous embodiment, the outer surface of the first ring and the inner surface of the second ring are formed at least in part congruently in relation to one another, such that the ends, in a latching state, can be clamped in between the congruently formed surfaces. The inner ring is insertable into the outer ring from the connection side.

According to a further advantageous embodiment, the second ring has, radially on its inside, a completely encircling holding groove which is open radially towards the inside and has a round cross section. According to this embodiment, the first ring is in one piece and shaped with a round cross section in a region of the outer surface. The first ring consists of a single material which is flexible in such a manner that the first ring can snap into the holding groove to achieve the latching state.

BRIEF DESCRIPTION OF THE DRAWINGS

Embodiments of the system described herein are explained in more detail in the following text with reference to figures, in which.

DETAILED DESCRIPTION OF VARIOUS EMBODIMENTS

Figure 1:
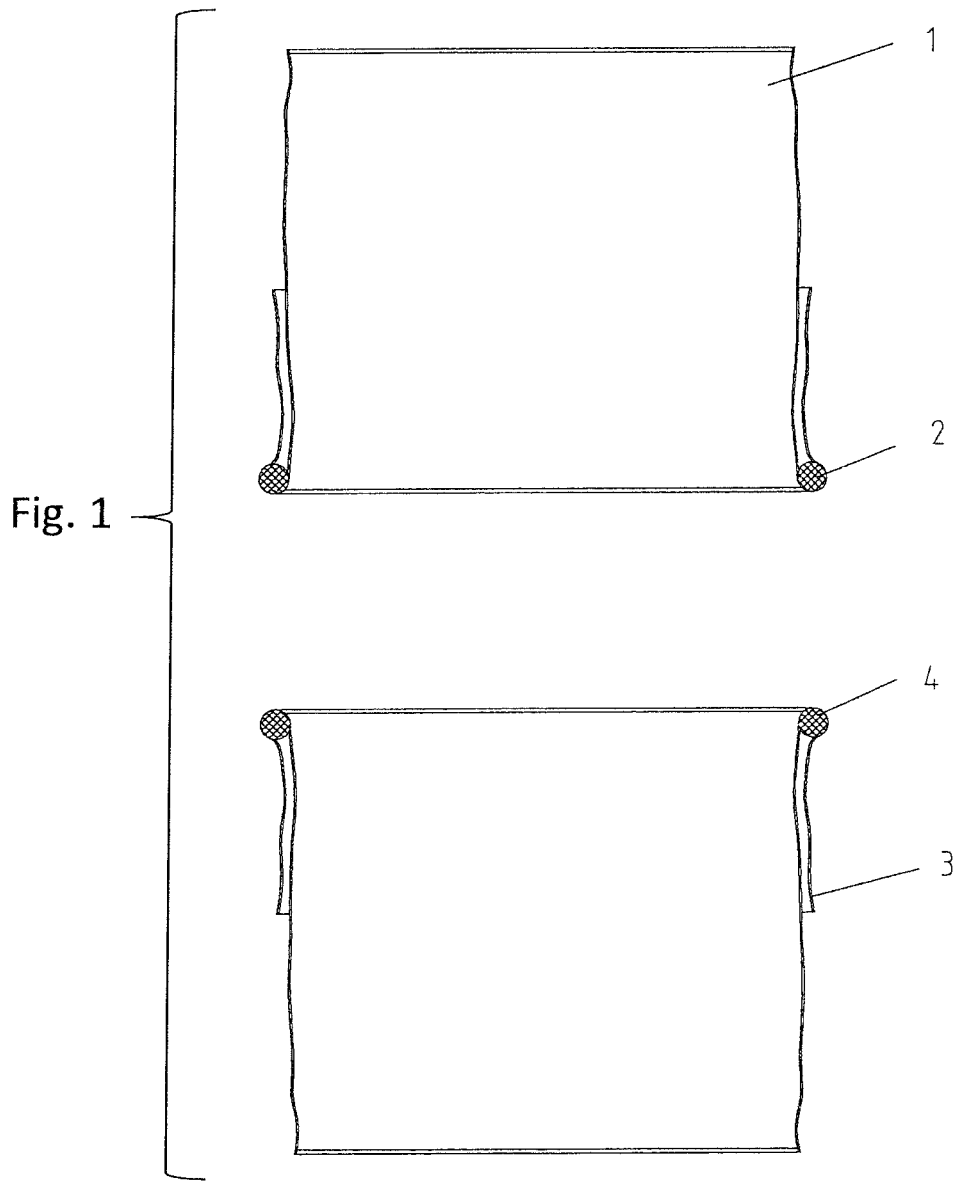
FIG. 1 shows two rings according to a first exemplary embodiment which are aligned parallel in relation to one another and have everted ends of flexible containers.
Figure 2:
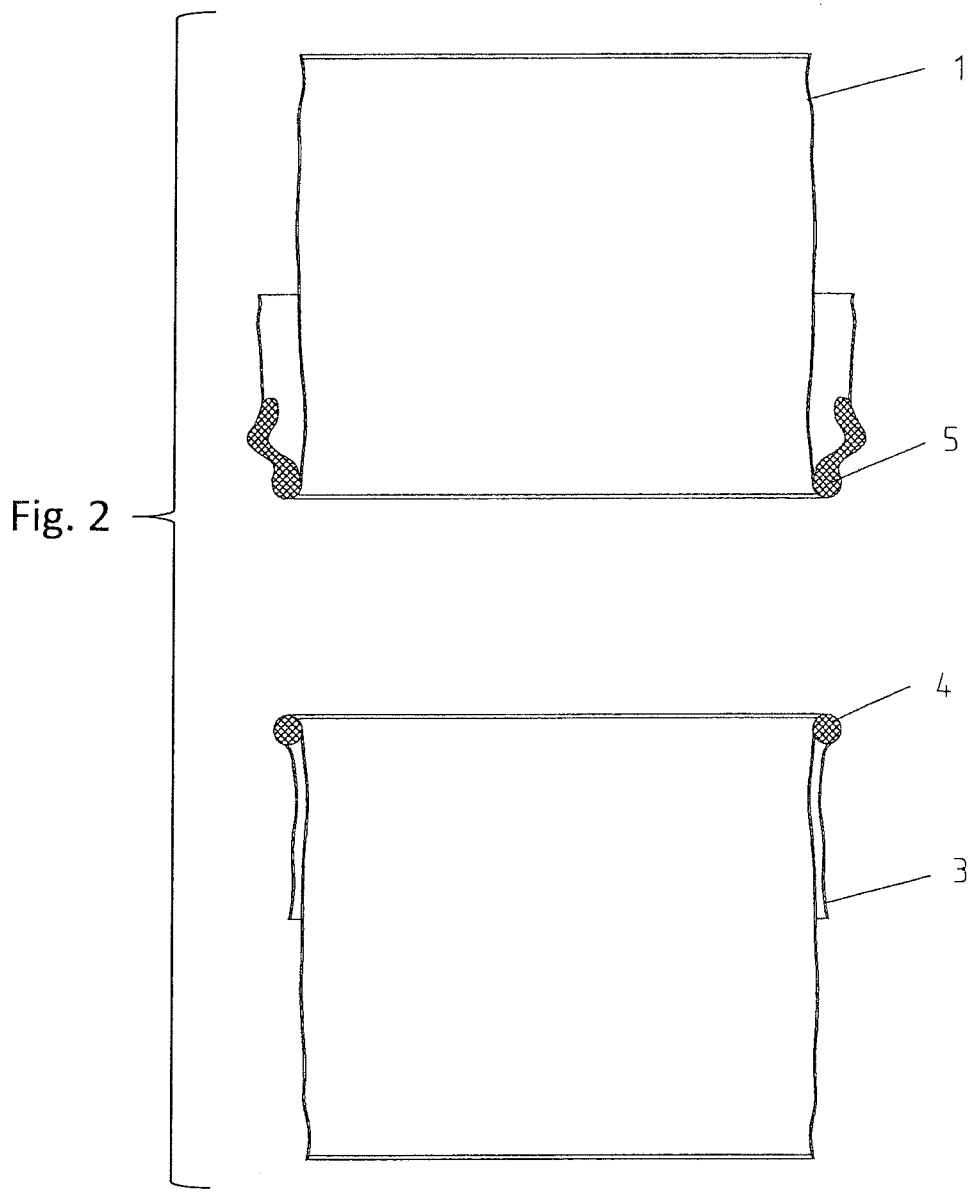
FIG. 2 shows two rings according to a second exemplary embodiment which are aligned parallel in relation to one another and have everted ends of flexible containers.
Figure 6:
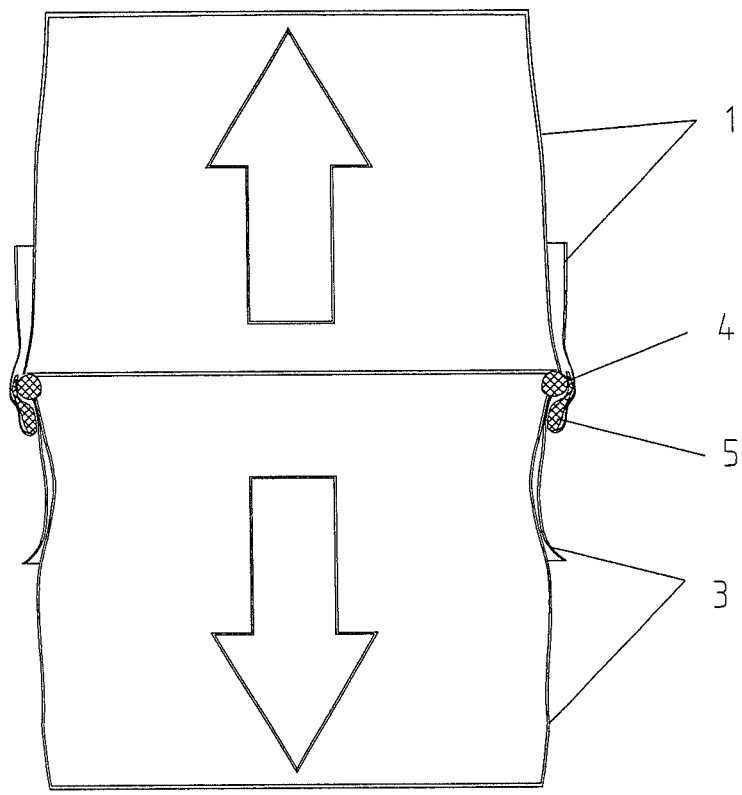
FIG. 6 shows an illustration, analogous to FIG. 5, of rings according to the second exemplary embodiment in a latching state.

FIGS. 1 to 6 elucidate methods according to the system described herein for connecting flexible containers 1, 3 in two exemplary embodiments. FIGS. 1 and 3 to 5 refer to a number of states of the method according to a first exemplary embodiment. FIGS. 2 and 6 refer to the commencement and the completion of the method according to a second exemplary embodiment, after which a latching state is achieved (FIG. 6).

Figure 3:
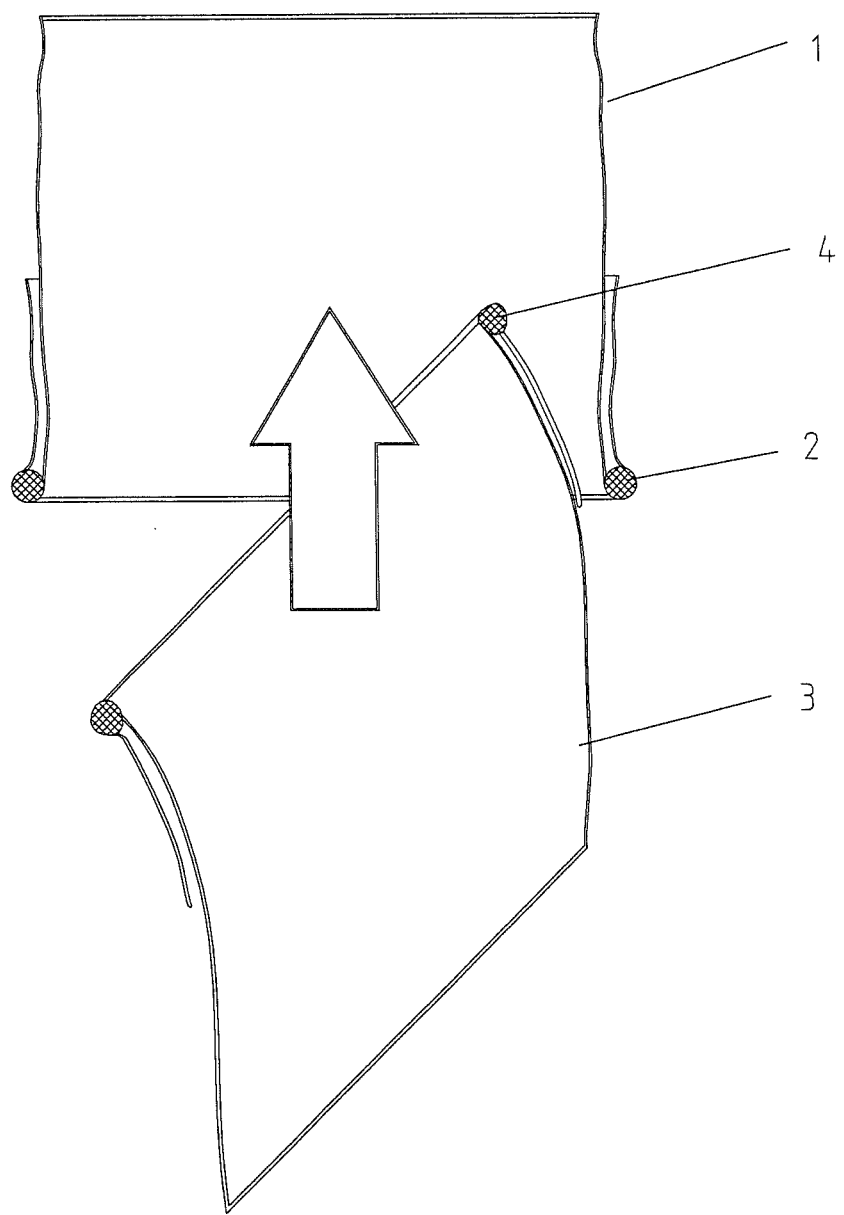
FIG. 3 shows (an) insertion of a first of the rings according to the first exemplary embodiment through the second ring.
Figure 4:
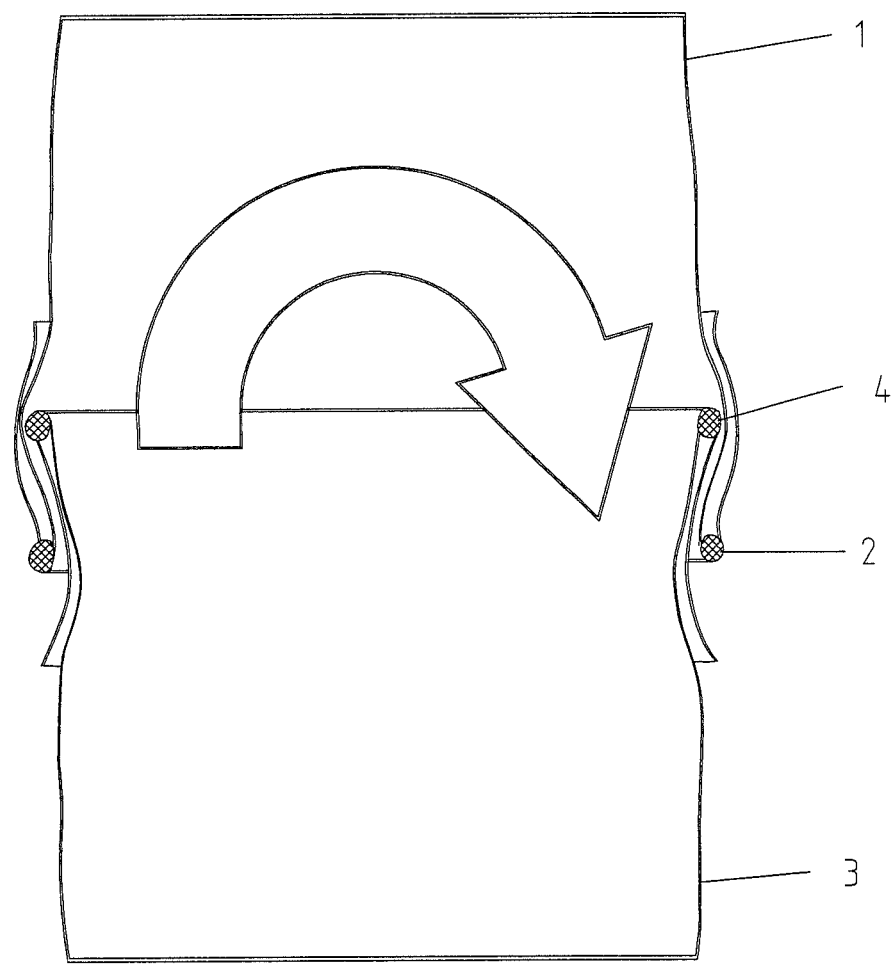
FIG. 4 shows rings according to the first exemplary embodiment, aligned parallel in relation to one another, after the insertion.
Figure 5:
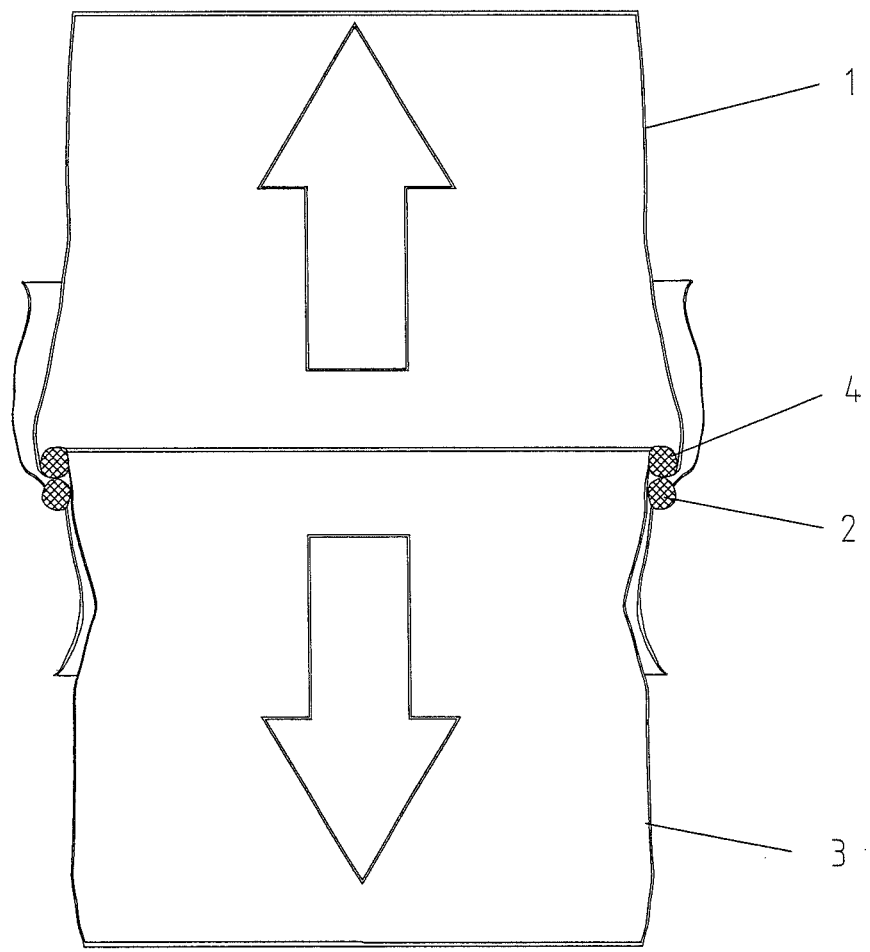
FIG. 5 shows the rings with open ends from FIG. 4 after The rings have been brought into abutment.

The method according to the system described herein is, in particular, suited to the environmentally tight connecting of two endless tubular films. FIG. 1 and FIG. 2 show a commencement of the method with rings 2; 5, 4, which are aligned parallel in relation to one another, and with open ends of the flexible containers 1, 3 having been everted over said rings. FIG. 3 shows the subsequent insertion of a first ring 4, through a second ring 2; 5, into the second flexible container 1. In the second container 1, a comprehensive parallel and coaxial alignment of the rings 2; 5, 4 in relation to one another occurs, the result being illustrated in FIG. 4. Finally, the rings 2; 5, 4 are brought into abutment with the ends clamped in between them.

In the case of the method according to the second exemplary embodiment according to FIGS. 2 and 6, a latching state is achieved when the rings are brought into abutment (FIG. 6).

The rings 2, 4 according to FIGS. 1 and 3 to 5 are formed identically.

In contrast thereto, the rings 5, 4 according to FIGS. 2 and 6 complement one another, the as second ring 5 in the method according to the second exemplary embodiment having on its inside an encircling indentation which is formed accordingly to mirror the rounding of a round cross section of the first ring 4.

The indentation is arranged to be open toward an axial side of the second ring 5. The second ring 5 has a superelevation at approximately the one o'clock position when viewed in cross section, such that an entry cross section is formed which is smaller than the outer diameter of the first ring. In this manner, the method is complemented, according to an advantageous embodiment, with a latching state.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for connecting two flexible containers, comprising:
    everting a first open end of a first flexible container around a first ring;
    everting a second open end of a second flexible container around a second ring;
    subsequently inserting the first ring, through the second ring, into the second flexible container;
    subsequently aligning, in a parallel and coaxial relationship, the rings in relation to one another; and
    abutting the rings with the ends clamped in between them,
    wherein the second ring has, on an inside thereof, an encircling indentation which is formed accordingly to mirror a rounding of a round cross section of the first ring,
    wherein the indentation is arranged to be open toward an axial side, and
    wherein the first ring and the second ring are brought into abutment and snap into each other when the ends are pulled.

2. The method according to claim 1, wherein a latching state is achieved when the rings are brought into abutment.

3. A ring system for connecting two flexible containers, comprising:
    a first ring; and
    a second ring,
    wherein a first open end of a first flexible container is evertable around the first ring,
    wherein a second open end of a second flexible container is evertable around the second ring;
    wherein the first ring is subsequently insertable, through the second ring, into the second flexible container,
    wherein the rings are subsequently alignable, in a parallel and coaxial relationship, to one another;
    wherein the rings are abuttable with the ends clamped in between them,
    wherein the second ring has, on an inside thereof, an encircling indentation which is formed accordingly to mirror a rounding of a round cross section of the first ring,
    wherein the indentation is arranged to be open toward an axial side, and
    wherein the first ring and the second ring are brought into abutment and snap into each other when the ends are pulled.

4. The ring system according to claim 3, wherein the second ring has a superelevation at approximately a one o'clock position when viewed in cross section, such that an entry cross section is formed which is smaller than an outer diameter of the first ring.

* * * * *